US012600542B2

(12) United States Patent
Suzuki

(10) Patent No.: US 12,600,542 B2
(45) Date of Patent: Apr. 14, 2026

(54) MULTILAYER STRUCTURE AND PACKAGING MATERIAL COMPRISING SAME

(71) Applicant: KURARAY CO., LTD., Okayama (JP)

(72) Inventor: Makoto Suzuki, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 790 days.

(21) Appl. No.: 17/276,493

(22) PCT Filed: Oct. 3, 2019

(86) PCT No.: PCT/JP2019/039214
§ 371 (c)(1),
(2) Date: Mar. 16, 2021

(87) PCT Pub. No.: WO2020/071513
PCT Pub. Date: Apr. 9, 2020

(65) Prior Publication Data

US 2021/0269209 A1 Sep. 2, 2021

(30) Foreign Application Priority Data

Oct. 4, 2018 (JP) ................................ 2018-189161

(51) Int. Cl.

| | |
|---|---|
| ***B32B 27/30*** | (2006.01) |
| ***B32B 7/12*** | (2006.01) |
| ***B32B 27/32*** | (2006.01) |
| ***B65D 65/40*** | (2006.01) |

(52) U.S. Cl.
CPC ................ *B65D 65/40* (2013.01); *B32B 7/12* (2013.01); *B32B 27/306* (2013.01); *B32B 27/308* (2013.01); *B32B 27/32* (2013.01); *B32B 2250/02* (2013.01); *B32B 2250/03* (2013.01); *B32B 2250/24* (2013.01); *B32B 2307/308* (2013.01); *B32B 2307/536* (2013.01); *B32B 2307/558* (2013.01); *B32B 2307/72* (2013.01); *B32B 2553/00* (2013.01)

(58) Field of Classification Search
None
See application file for complete search history.

(56) References Cited

U.S. PATENT DOCUMENTS

| | | | |
|---|---|---|---|
| 4,349,644 A | 9/1982 | Iwanami et al. | |
| 6,372,359 B1 | 4/2002 | Hayashi et al. | |
| 2004/0096683 A1* | 5/2004 | Ikeda | B29B 9/12 428/476.3 |
| 2004/0175466 A1* | 9/2004 | Douglas | B32B 27/34 426/129 |
| 2015/0152256 A1* | 6/2015 | Nakazawa | B32B 27/306 428/500 |
| 2015/0210788 A1* | 7/2015 | Okamoto | B32B 27/32 524/557 |
| 2019/0345280 A1 | 11/2019 | Hoshika et al. | |
| 2019/0345309 A1 | 11/2019 | Okamoto et al. | |
| 2021/0001608 A1 | 1/2021 | Ishiuchi et al. | |

FOREIGN PATENT DOCUMENTS

| | | | |
|---|---|---|---|
| GB | 2096619 | A | 10/1982 |
| JP | S56-86949 | A | 7/1981 |
| JP | 2000-318095 | A | 11/2000 |
| JP | 2001-079996 | A | 3/2001 |
| JP | 2004292677 | A * | 10/2004 |
| JP | 2014-034647 | A | 2/2014 |
| WO | 2009/051158 | A1 | 4/2009 |

OTHER PUBLICATIONS

JP-2004292677 (Year: 2004).*
International Search Report issued in corresponding International Patent Application No. PCT/JP2019/039214 dated Nov. 12, 2019.

* cited by examiner

*Primary Examiner* — Samir Shah
(74) *Attorney, Agent, or Firm* — Morgan, Lewis & Bockius LLP

(57) ABSTRACT

There is provided a multilayer structure having a hard layer (A) and either a resin composition layer (B1) or a resin composition layer (B2), wherein the hard layer (A) has a puncture strength of 40 N/mm or more and 150 N/mm or less; the resin composition layer (B1) is made of a resin comprising an ethylene-vinyl alcohol copolymer (b1) having a melting point Tm1 of 170° C. or more and an ethylene-vinyl alcohol copolymer (b2) having a melting point Tm2 of less than 170° C.; and the resin composition layer (B2) is made of a resin comprising a modified ethylene-vinyl alcohol copolymer containing a modifying group having a primary hydroxy group represented by formula (I). The multilayer structure is excellent in mechanical strength and thermal formability, and when being recovered, allows for melt kneading with less hard spots due to resin deterioration (gelation), showing excellent recyclability.

(I)

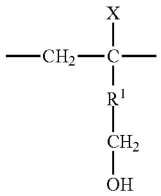

18 Claims, No Drawings

MULTILAYER STRUCTURE AND PACKAGING MATERIAL COMPRISING SAME

TECHNICAL FIELD

The present invention relates to a multilayer structure which is excellent in thermal formability and allows for recovering and recycling with less hard spots, as well as a packaging material with the multilayer structure.

BACKGROUND ART

A gas barrier resin film made of an ethylene-vinyl alcohol copolymer (hereinafter, sometimes referred to as "EVOH") has been conventionally used as a transparent packaging material with high oxygen barrier properties. Furthermore, taking advantage of thermal formability in addition to higher gas barrier properties, EVOH has been also used for applications such as a laminated packaging material. A known example of a laminated packaging material is a laminated film produced by co-extruding a polyamide resin (Nylon) on both sides of an EVOH for improving strength of a laminated film (Patent Reference No. 1).

PRIOR ART REFERENCE

Patent Reference

Patent Reference No. 1: JP 2001-79996 A

SUMMARY OF THE INVENTION

Problems to be Solved by the Invention

A laminated film described in Patent Reference No. 1 has a problem that when it is recovered and recycled, a polyamide resin and an EVOH chemically react to be crosslinked and form hard spots, leading to deterioration in recyclability.

To solve the above problems, an objective of the present invention is to provide a multilayer structure which is excellent in mechanical strength and thermal formability, and allows for recovering and recycling with less hard spots, as well as a packaging material with the multilayer structure.

Means for Solving the Problems

The above problems can be solved by providing the followings.

[1] A multilayer structure having a hard layer (A) and either a resin composition layer (B1) or a resin composition layer (B2), wherein

- the hard layer (A) has a puncture strength of 40 N/mm or more and 150 N/mm or less;
- the resin composition layer (B1) is made of a resin comprising an ethylene-vinyl alcohol copolymer (b1) (hereinafter, sometimes referred to as "EVOH(b1)") having a melting point Tm1 of 170° C. or more and an ethylene-vinyl alcohol copolymer (b2) (hereinafter, sometimes referred to as "EVOH(b2)") having a melting point Tm2 of less than 170° C.; and
- the resin composition layer (B2) is made of a resin comprising a modified EVOH containing a modifying group having a primary hydroxy group represented by formula (I),

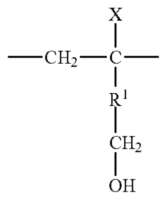

(I)

wherein X represents a hydrogen atom, a methyl group or a group represented by $R^2$—OH; $R^1$ and $R^2$ represent independently of each other a single bond, an alkylene group having 1 to 9 carbon atoms or an alkyleneoxy group having 1 to 9 carbon atoms; and the alkylene group and the alkyleneoxy group optionally contain a hydroxy group, an alkoxy group or a halogen atom;

[2] The multilayer structure according to [1], wherein a mass ratio (b2/b1) of EVOH(b2) to EVOH(b1) is 1/99 to 50/50;

[3] The multilayer structure according to [1] or [2], wherein an absolute value |b2-b1| of a difference between an ethylene content (mol %) of EVOH(b2) and an ethylene content (mol %) of EVOH(b1) is 5 or more;

[4] The multilayer structure according to any of [1] to [3], wherein the hard layer (A) comprises an olefinic polymer;

[5] The multilayer structure according to [4], wherein the olefinic polymer is a linear low-density polyethylene;

[6] The multilayer structure according to [5], wherein the linear low-density polyethylene is an ethylene polymer or copolymer made by polymerization using a metallocene catalyst;

[7] The multilayer structure according to any of [4] to [6], wherein the olefinic polymer comprises a plant-derived polyethylene;

[8] The multilayer structure according to [4], wherein the olefinic polymer is an ethylene-unsaturated carboxylic acid copolymer ionomer;

[9] The multilayer structure according to any of [4] to [7], wherein a density of the olefinic polymer is 0.940 or less;

[10] The multilayer structure according to any of [4] to [9], wherein a melting point of the olefinic polymer is 130° C. or less;

[11] The multilayer structure according to any of [4] to [10], wherein a melt flow rate (190° C., 2160 g) (hereinafter, a melt flow rate is sometimes referred to as "MFR") of the olefinic polymer is less than 5.0 g/10 min;

[12] The multilayer structure according to any of [1] to [11], wherein the resin composition layer (B1) or the resin composition layer (B2) is disposed between two hard layers (A);

[13] The multilayer structure according to any of [1] to [12], further comprising an adhesive resin layer (C) between the hard layer (A) and either the resin composition layer (B1) or the resin composition layer (B2);

[14] The multilayer structure according to [13], having a layer structure of the adhesive resin layer (C)/the resin composition layer (B1) or the resin composition layer (B2)/the adhesive resin layer (C);

[15] A packaging material comprising the multilayer structure according to any of [1] to [14];

[16] A recovered composition comprising a recovered material of the multilayer structure according to any of [1] to [14];

[17] A method for producing a recovered composition, comprising melt kneading a recovered material of the multilayer structure according to any of [1] to [14].

Effects of the Invention

A multilayer structure of the present invention and a packaging material therewith are excellent in mechanical strength and thermal formability, and when being recovered, allow for melt molding with less hard spots due to resin deterioration (gelation), showing excellent recyclability.

MODES FOR CARRYING OUT THE INVENTION

A multilayer structure of the present invention is a multilayer structure having a hard layer (A) and either a resin composition layer (B1) or a resin composition layer (B2), wherein

- the hard layer (A) has a puncture strength of 40 N/mm or more and 150 N/mm or less;
- the resin composition layer (B1) is made of a resin comprising EVOH(b1) having a melting point Tm1 of 170° C. or more and EVOH(b2) having a melting point Tm2 of less than 170° C.; and
- the resin composition layer (B2) is made of a resin comprising a modified EVOH containing a modifying group having a primary hydroxy group represented by formula (I), (I)

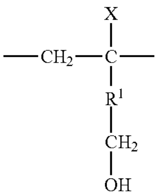

wherein X represents a hydrogen atom, a methyl group or a group represented by $R^2$—OH; $R^1$ and $R^2$ represent independently of each other a single bond, an alkylene group having 1 to 9 carbon atoms or an alkyleneoxy group having 1 to 9 carbon atoms; and the alkylene group and the alkyleneoxy group optionally contain a hydroxy group, an alkoxy group or a halogen atom.

(Hard Layer (A))

A puncture strength of a hard layer (A) is 40 N/mm or more and 150 N/mm or less. With a puncture strength being within the range, formation of pin holes can be prevented in a packaging material with a multilayer structure of the present invention when a food or the like packaged in the packaging material is carried. The puncture strength is preferably 45 N/mm or more, more preferably 50 N/mm or more, further preferably 55 N/mm or more, particularly preferably 65 N/mm or more. The puncture strength is preferably 120 N/mm or less, more preferably 100 N/mm or less, further preferably 75 N/mm or less. A puncture strength of the hard layer (A) in the present specification is a value (N/mm) obtained as follows; a humidity of a test piece of a monolayer film having the same composition as the hard layer (A) is adjusted under the conditions of 23° C. and 50% RH for 24 hours, under the same conditions, a load when a needle with a tip diameter of 1 mm penetrates the test piece at a speed of 50 mm/min is measured, and an average of the measurements is divided by a thickness of the test piece (mm).

Examples of a resin used for a hard layer (A) include olefinic polymers, polyesters, polystyrene, polyvinyl chloride, polyvinylidene chloride, acrylic resins, vinyl ester resins, polyester elastomers, polyurethane elastomers, chlorinated polyethylene, chlorinated polypropylene, aromatic or aliphatic polyketones and aliphatic alcohols, preferably olefinic polymers.

Examples of an olefinic polymer include olefin homopolymers or copolymers such as linear low density polyethylene (LLDPE), low density polyethylene (LDPE), very low density polyethylene (VLDPE), medium density polyethylene (MDPE), high density polyethylene (HDPE), ethylene-vinyl acetate copolymer (EVA), olefin-unsaturated carboxylic acid copolymer ionomer, ethylene-propylene copolymer, ethylene-acrylic acid ester copolymer, polypropylene, propylene-α-olefin (α-olefin having 4 to 20 carbon atoms) copolymer, polybutene and polypentene; homopolymers or copolymers of these olefins graft-modified with an unsaturated carboxylic acid or an ester thereof; and blends thereof. In particular, linear low-density polyethylene (LL-DPE) and an ethylene-unsaturated carboxylic acid copolymer ionomer are preferable in the light of allowing for easily adjusting a puncture strength of a hard layer (A) within the above range.

A raw material for the above polyethylene can be petroleum-derived or plant-derived, and in the light of reduction of environmental burden during production, the olefinic polymer preferably contains a plant-derived polyethylene obtained using a plant-derived raw material.

The linear low-density polyethylene is particularly preferably an ethylene polymer or copolymer made by polymerization using a metallocene catalyst. An ethylene polymer or copolymer made by polymerization using a metallocene catalyst is an ethylene homopolymer or a copolymer of ethylene with an α-olefin having three or more carbon atoms, which is produced by polymerizing ethylene or copolymerizing ethylene with the α-olefin in the presence of a catalyst composed of a transition metal of IV group in a periodic table having at least one ligand having a cyclopentadienyl skeleton, preferably a zirconium compound, an organoaluminumoxy compound, and various components which are added as necessary.

Examples of an α-olefin having 3 or more carbon atoms in the above ethylene copolymer include propylene, 1-butene, 1-pentene, 1-hexene, 1-octene, 1-decene, 1-dodecene and 4-methyl-1-pentene. The ethylene copolymer is particularly preferably a copolymer with an α-olefin having 3 to 12 carbon atoms.

An ethylene polymer or copolymer made by polymerization using a metallocene catalyst is industrially produced and commercially available; for example, "KERNEL" (manufactured by Japan Polychem Corporation), "EVOLUE" (manufactured by Prime Polymer Co., Ltd.), "Exact" (manufactured by ExxonMobile Chemical), and "AFFINITY" "ENGAGE" (manufactured by Dow Chemical).

A density of the olefinic polymer is preferably 0.940 or less. With a density being within the range, a multilayer structure obtained has sufficient drawability and excellent puncture strength. The density is more preferably 0.930 or less, further preferably 0.920 or less, particularly preferably 0.915 or less, most preferably 0.910 or less.

A melting point of the olefinic polymer is preferably 130° C. or less. With a melting point being within the range, crystallinity of the olefinic polymer is reduced, so that a multilayer structure obtained has sufficient drawability and further improved puncture strength. The melting point is more preferably 120° C. or less, further preferably 110° C. or less, particularly preferably 100° C. or less. A melting point of the olefinic polymer is measured as later described for an EVOH.

An MFR (190° C., 2160 g) of the olefinic polymer is preferably less than 5.0 g/10 min. With an MFR being within the above range, a multilayer structure obtained has sufficient drawability and further improved puncture strength. The MFR is more preferably less than 2.0 g/10 min, further preferably less than 1.5 g/10 min. An MFR of the olefinic polymer is determined at 190° C. under a load of 2.16 kg in accordance with JIS K 7210.

The olefin-unsaturated carboxylic acid copolymer ionomer is a copolymer of an olefin as a main component with an unsaturated carboxylic acid and/or an unsaturated carboxylic acid ester, in which the carboxylic acid component is optionally (partially) neutralized with a metal ion. Examples of an olefin constituting the copolymer include ethylene, propylene, butylene and styrene, particularly suitably ethylene.

Examples of an unsaturated carboxylic acid constituting an olefin-unsaturated carboxylic acid copolymer ionomer include ethylenic unsaturated monocarboxylic acids such as acrylic acid, methacrylic acid, ethacrylic acid and crotonic acid; and ethylenic unsaturated dicarboxylic acids, anhydrides thereof or half esters thereof such as fumaric acid, itaconic acid, maleic acid, monomethyl maleate, monoethyl maleate and maleic anhydride, most suitably acrylic acid and methacrylic acid. A content of the unsaturated carboxylic acid in the copolymer is preferably 1 to 30% by mass, more preferably 2 to 25% by mass, further preferably 3 to 20% by mass. If a content of the unsaturated carboxylic acid is less than 1% by mass, thermal formability of a multilayer structure obtained may be insufficient, and if it is more than 30% by mass, thermal stability of the hard layer (A) may be deteriorated.

Examples of a metal ion which (partially) neutralizes a carboxylic acid component of an olefin-unsaturated carboxylic acid copolymer include zinc, sodium, potassium, magnesium, calcium, barium and lithium, preferably zinc, sodium and potassium. A degree of neutralization of a carboxylic acid component by a metal ion is preferably 5 to 100%, more preferably 10 to 90%, further preferably 30 to 70%.

A content of a resin in a hard layer (A) is preferably 50% by mass or more, more preferably 80% by mass or more, further preferably 90% by mass or more.

(Resin Composition Layer (B1))

A resin constituting a resin composition layer (B1) consists of EVOH(b1) and EVOH(b2). If a melting point Tm1 of EVOH(b1) is less than 170° C., puncture strength and gas barrier properties of a multilayer structure obtained are deteriorated. If a melting point Tm2 of EVOH(b2) is 170° C. or more, thermal formability of a multilayer structure obtained is deteriorated. A resin constituting a resin composition layer (B1) preferably consists exclusively of EVOH (b1) and EVOH(b2).

In the light of improving balance between puncture strength and gas barrier properties, and thermal formability, a difference (Tm1−Tm2) between a melting point Tm1 of EVOH(b1) and a melting point Tm2 of EVOH(b2) is preferably 5 or more, more preferably 10 or more, further preferably 15 or more, particularly preferably 20 or more.

Herein, a melting point is measured by a differential scanning calorimeter (DSC) in accordance with JIS K7121, in which a sample is once heated to 200° C., then cooled to a temperature lower by about 50° C. than a glass transition temperature at a cooling rate of 30° C./min, and heated again at a temperature elevation rate of 10° C./min (second run).

A method for adjusting a melting point Tm1 and a melting point Tm2 to the above range is, for example, adjusting an ethylene content in EVOH. Furthermore, in EVOH with the same ethylene content, its saponification degree can be adjusted to adjust a melting point. An ethylene content and a saponification degree of EVOH can be determined by nuclear magnetic resonance (NMR) method.

An absolute value $|b2-b1|$ of a difference between an ethylene content (mol %) of EVOH(b2) and an ethylene content (mol %) of EVOH(b1), which constitute the resin composition layer (B1), is preferably 5 or more. The absolute value $|b2-b1|$ is more preferably 7 or more, further preferably 9 or more, particularly preferably 15 or more. Meanwhile, the absolute value $|b2-b1|$ is preferably 30 or less, more preferably 20 or less.

An ethylene content of EVOH(b1) is preferably 15 to 38 mol %, more preferably 18 to 35 mol %. An ethylene content of EVOH(b2) is preferably 35 to 55 mol %, more preferably 38 to 45 mol %. If each ethylene content is less than the range, gas barrier properties at high humidity and thermal formability of a multilayer structure obtained may be deteriorated, and if it is more than the range, gas barrier properties of a multilayer structure obtained may be insufficient.

Saponification degrees of both EVOH(b1) and EVOH(b2) are preferably 90 mol % or more, more preferably 95 mol % or more, further preferably 99 mol % or more. If the saponification degrees are less than 90 mol %, gas barrier properties and thermal formability may be deteriorated.

EVOH(b1) and EVOH(b2) can be distinguished from a single composition (one kind) EVOH in thermal analysis, particularly DSC analysis. When two types of EVOHs mixed have significantly different melting points, two or more DSC peaks are generally observed. When EVOHs having close melting points are mixed, an apparently single peak may be observed, depending on a mixing mass ratio or the like, or when melting points are different from each other by a given value or more, a peak shape may be broad. Nevertheless, even when a single peak is observed, by reducing a temperature elevation rate in measurement of a melting point of EVOH in DSC, two peaks may be observed or a shoulder peak on a main peak may be observed. Thus, from the features of peaks in a DSC curve observed in DSC analysis, a resin composition layer (B1) used for the present invention can be determined.

A mass ratio (b2/b1) of EVOH(b2) to EVOH(b1) in a resin composition layer (B1) is preferably 1/99 to 50/50. With a mass ratio (b2/b1) being within the range, thermal formability is good. A mass ratio (b2/b1) is more preferably 5/95 or more. Meanwhile, a mass ratio (b2/b1) is more preferably 40/60 or less.

The total content of EVOH(b1) and EVOH(b2) in a resin composition layer (B1) is preferably 50% by mass or more, more preferably 80% by mass or more, further preferably 90% by mass or more.

EVOH(b1) and EVOH(b2) can be produced by saponifying an ethylene-vinyl acetate copolymer. An ethylene-vinyl acetate copolymer is produced by a known polymerization process such as solution polymerization, suspension polymerization and emulsion polymerization. An ethylene-vinyl acetate copolymer can be also saponified by a known process. As long as the effects of the present invention are not deteriorated, a copolymerizable ethylenic unsaturated monomer can be copolymerized; examples of such a monomer include olefins such as propylene, 1-butene and isobutene; unsaturated acids such as acrylic acid, methacrylic acid, crotonic acid, phthalic acid (anhydride), maleic acid (anhydride) and itaconic acid (anhydride), or salts thereof, or mono- or di-alkyl esters having 1 to 18 carbon atoms thereof; acrylamides such as acrylamide, N-alkylacrylamide having 1 to 18 carbon atoms, N,N-dimethylacrylamide, 2-acrylamidepropanesulfonic acid or salts thereof, acrylamidepropyldimethylamine or acid salts thereof or quaternary salts thereof; methacrylamides such as methacrylamide, N-alkylmethacrylamide having 1 to 18 carbon atoms, N,N-dimethylmethacrylamide, 2-methacrylamidepropanesulfonic acid or salts thereof, methacrylamidepropyldimethylamine or acid salts thereof or quaternary salts thereof; N-vinylamides such as N-vinylpyrrolidone, N-vinylformamide and N-vinylacetamide; nitriles such as acrylonitrile and methacrylonitrile; vinyl ethers such as alkyl vinyl ethers having 1 to 18 carbon atoms, hydroxyalkyl vinyl ether and alkoxyalkyl vinyl ether; vinyl halides such as vinyl chloride, vinylidene chloride, vinyl fluoride, vinylidene fluoride and vinyl bromide; vinylsilanes such as trimethoxyvinylsilane; allyl acetate; allyl chloride; allyl alcohol; dimethylallyl alcohol; trimethyl-(3-acrylamide-3-dimethylpropyl)-ammonium chloride; and acrylamide-2-methylpropanesulfonic acid.

There are no particular restrictions to a mixing method of EVOH(b1) and EVOH(b2), and in the light of homogeneous mixing, kneading in the molten state is preferable. The kneading can be conducted using a known kneader such as a kneader-ruder, an extruder, a mixing roll, a Banbury mixer and a plastomill. Industrially preferred is using a single-screw or twin-screw extruder, which is, if necessary, preferably equipped with a vent aspirator, a gear pump device, a screen device or the like. Specific examples of the method include (1) a method comprising dry-blending EVOH(b1) and EVOH(b2) and then supplying the whole quantity of the mixture to an extruder, (2) a method comprising supplying one EVOH to an extruder, melting it and then adding the other EVOH to it, and (3) a method comprising supplying one EVOH to an extruder, melting it, and then supplying the other molten EVOH. Among these, the method (1) is practically useful in the light of simplicity of apparatus, a cost and the like.

(Resin Composition Layer (B2))

A resin constituting a resin composition layer (B2) contains a modified EVOH containing a modifying group having a primary hydroxy group represented by Formula (I). The modified EVOH contains, in addition to an ethylene unit and a vinyl alcohol unit, a modifying group having a primary hydroxy group, so that thermal formability of a multilayer structure obtained is improved and adhesiveness of a resin composition layer (B2) to an adhesive resin layer (C) described later is improved.

(I)

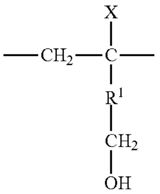

In formula (I), X represents a hydrogen atom, a methyl group or a group represented by $R^2$—OH; $R^1$ and $R^2$ represent, independently of each other, a single bond, an alkylene group having 1 to 9 carbon atoms or an alkyleneoxy group having 1 to 9 carbon atoms; and the alkylene group and the alkyleneoxy group optionally contain a hydroxy group, an alkoxy group or a halogen atom.

In the modified EVOH, an ethylene unit content based on the whole monomer units is preferably 18 mol % or more and 55 mol % or less. If an ethylene unit content is less than 18 mol %, melt formability may be deteriorated. An ethylene unit content is more preferably 25 mol % or more. If an ethylene unit content is more than 55 mol %, gas barrier properties may be insufficient. An ethylene unit content is more preferably 50 mol % or less, further preferably 45 mol % or less.

In the modified EVOH, a saponification degree of a vinyl ester component is preferably 90% or more, more preferably 95% or more, further preferably 98% or more, particularly preferably 99% or more.

X is preferably a hydrogen atom or a group represented by $R^2$—OH, more preferably a group represented by $R^2$—OH. A group represented by $R^2$—OH is preferably a hydroxyalkyl group ($R^2$ is an alkylene group).

An alkylene group and an alkyleneoxy group used as $R^1$ and $R^2$ optionally contain a hydroxy group, an alkoxy group or a halogen atom. The alkylene group and the alkyleneoxy group can be linear or branched, or form a ring. $R^1$ and $R^2$ are preferably an alkylene or alkyleneoxy group having 1 to 5 carbon atoms, more preferably an alkylene or alkyleneoxy group having 1 to 3 carbon atoms.

Specific examples of the structure (modifying group) represented by formula (I) are structural units represented by formulas (II) to (IV), particularly preferably a structural unit represented by formula (II).

(II)

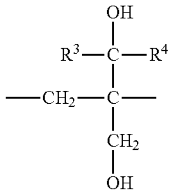

In formula (II), $R^3$ and $R^4$ represent, independently of each other, a hydrogen atom or an alkyl group having 1 to 10 carbon atoms, and the alkyl group can contain a hydroxy group, an alkoxy group or a halogen atom.

(III)

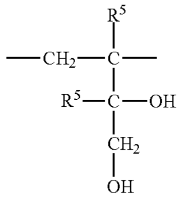

In formula (III), $R^5$ is as defined for X in formula (I); $R^6$ represents a hydrogen atom or an alkyl group having 1 to 8 carbon atoms; and the alkyl group can contain a hydroxy group, an alkoxy group or a halogen atom.

(IV)

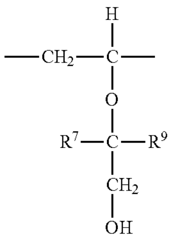

In formula (IV), $R^7$ and $R^8$ represent, independently of each other, a hydrogen atom, an alkyl group having 1 to 8 carbon atoms, a cycloalkyl group having 3 to 8 carbon atoms, or a hydroxy group, and some or all of hydrogen atoms in the alkyl group and the cycloalkyl group can be replaced by a hydroxy group, an alkoxy group or a halogen atom.

In the present invention, it is preferable that in formula (I), $R^1$ is a single bond and X is a hydroxymethyl group (in formula (II), $R^3$ and $R^4$ are a hydrogen atom). Using the modified EVOH having this modifying group in a resin composition layer (B2), thermal formability and gas barrier properties of a multilayer structure obtained are improved. Here, a content of the modifying group having a primary hydroxy group in the modified EVOH is preferably 0.05 mol % or more and 20 mol % or less. If a content of the modifying group is less than 0.05 mol %, thermal formability may be deteriorated. A content of the modifying group is more preferably 0.1 mol % or more, further preferably 0.4 mol % or more, most preferably 0.8 mol % or more. If a content of the modifying group is more than 20 mol %, barrier properties may be deteriorated. A content of the modifying group is more preferably 10 mol % or less, further preferably 8 mol % or less, most preferably 5 mol % or less.

In the present invention, it is also preferable that in formula (I), $R^1$ is a hydroxymethylene group; and X is a hydrogen atom (in formula (III), $R^5$ and $R^6$ are a hydrogen atom). Using the modified EVOH having this modifying group in a resin composition layer (B2), thermal formability of a multilayer structure obtained is improved. Here, a content of the modifying group having a primary hydroxy group in the modified EVOH is preferably 0.1 mol % or more and 20 mol % or less. If a content of the modifying group is less than 0.1 mol %, thermal formability may be deteriorated. A content of the modifying group is more preferably 0.4 mol % or more, further preferably 1.0 mol % or more. If a content of the modifying group is more than 20 mol %, barrier properties may be deteriorated. A content of the modifying group is more preferably 10 mol % or less, further preferably 5 mol % or less.

In the present invention, it is also preferable that in formula (I), $R^1$ is a methylmethyleneoxy group; and X is a hydrogen atom. Using the modified EVOH having this modifying group in a resin composition layer (B2), thermal formability of a multilayer structure obtained is improved. Furthermore, in the methylmethyleneoxy group, an oxygen atom is bonded to a carbon atom in the main chain. Specifically, it is preferable that in formula (IV), one of $R^7$ and $R^8$ is a methyl group and the other is a hydrogen atom. Here, a content of the modifying group having a primary hydroxy group in the modified EVOH is preferably 0.1 mol % or more and 20 mol % or less. If a content of the modifying group is less than 0.1 mol %, thermal formability may be deteriorated. A content of the modifying group is more preferably 1.0 mol % or more, further preferably 2.0 mol % or more. If a content of the modifying group is more than 20 mol %, barrier properties may be deteriorated. A content of the modifying group is more preferably 15 mol % or less, further preferably 10 mol % or less.

The modified EVOH can be a mixture with an unmodified EVOH. In the light of cost reduction, a mass ratio (modified EVOH/unmodified EVOH) of the modified EVOH to the unmodified EVOH in the mixture is preferably 1/9 to 9/1. In the light of more remarkable effects of the present invention, a mass ratio (modified EVOH/unmodified EVOH) is preferably 9/1 or more. More preferably, a resin composition layer (B2) is substantially free from an unmodified EVOH.

A content of the modified EVOH in a resin composition layer (B2) is preferably 50% by mass or more, more preferably 80% by mass or more, further preferably 90% by mass or more.

A modified EVOH containing the modifying group having a primary hydroxy group represented by formula (I) can be produced, for example, as described in WO 2018/52014.

As long as the objectives of the present invention are not impaired, resin composition layers (B1) and (B2) can contain other additives. Examples of the other additives which can be added include a lubricant such as saturated aliphatic amides (for example, stearic acid amide), unsaturated aliphatic acid amides (for example, oleic acid amide), bis-aliphatic acid amides (for example, ethylenebis(stearic acid amide)), aliphatic acid metal salts (for example, calcium stearate), and low molecular weight polyolefins (for example, low molecular weight polyethylene having a molecular weight of about 500 to 10,000, and low molecular weight polypropylene); an inorganic filler (for example, hydrotalcite); a plasticizer (for example, aliphatic polyols such as ethylene glycol, glycerol, and hexane diol); an oxygen absorber (for example, an inorganic oxygen absorber such as reduced iron powders, a mixture thereof with a water-absorbing substance, an electrolyte or the like, aluminum powder, potassium sulfite, and photocatalytic titanium oxide; an organic oxygen absorber such as ascorbic acid, an aliphatic acid ester or metal salt thereof, hydroquinone, gallic acid, polyhydric phenols including a hydroxy-containing phenol aldehyde resin, a coordinate bond compound of a nitrogen-containing compound with a transition metal such as bis-salicyl aldehyde-imine cobalt, tetraethylenepentamine cobalt, cobalt-Schiff base complex, porphyrins, macrocyclic polyamine complex and polyethyleneimine-cobalt complex, terpene compounds, reaction products of an amino acid with a hydroxyl-containing reducing substance, and triphenylmethyl compounds), a thermal stabilizer, a light stabilizer, an antioxidizing agent, an ultraviolet absorber, a colorant, an antistatic agent, a surfactant, an antimicrobial, antiblocking agent, a slip agent, and a filler (for example, an inorganic filler).

A resin composition layer (B1) or (B2) can contain, as other additives, an alkali metal such as sodium and potassium and/or an alkaline earth metal such as calcium and magnesium as a metal salt. Thus, crosslinking of a resin can be inhibited, and a multilayer structure with excellent recyclability can be obtained. Examples of an alkali metal salt include metal salts of an organic acid such as acetic acid, propionic acid, butyric acid, lauric acid, stearic acid, oleic acid and behenic acid; or metal salts of an inorganic acid such as sulfuric acid, sulfurous acid, carbonic acid, boric acid and phosphoric acid. A content of an alkali metal is preferably 5 to 1000 ppm, more preferably 10 to 500 ppm, further preferably 20 to 300 ppm based on a resin composition layer (B1) or (B2) in terms of a metal element. Examples of an alkaline earth metal salt include an acetate, a borate, a phosphate and a hydrogen phosphate. A content of an alkaline earth metal is preferably 5 to 500 ppm, more preferably 10 to 300 ppm, further preferably 20 to 250 ppm based on a resin composition layer (B1) or (B2) in terms of a metal element. When a resin composition layer (B1) or (B2) contains two or more alkali metals and/or alkaline earth metals, it is preferable that the sum total is within the above content range.

An alkali metal and/or an alkaline earth metal can be contained in a resin composition layer (B1) by preliminarily adding it to EVOH(b1) or EVOH(b2), adding it during blending EVOH(b1) and EVOH(b2), adding it to a resin composition layer (B1) after blending EVOH(b1) and EVOH(b2), or a combination thereof.

A method for preliminarily adding an alkali metal and/or an alkaline earth metal to EVOH can be (1) contacting a porous deposit of EVOH with a water content of 20 to 80% by mass with an aqueous solution of an alkali (alkaline earth) metal compound for adding the alkali metal compound to EVOH before drying, (2) adding an alkali (alkaline earth) metal compound to a homogenous solution of EVOH (for example, a water/alcohol solution), then extruding the solution in a strand shape into a coagulation liquid then cutting the strand into pellets, and drying the pellets, (3) blending EVOH and an alkali (alkaline earth) metal compound all together and then melt kneading the mixture using an extruder or the like, and (4) in producing EVOH, neutralizing an alkali (for example, sodium hydroxide and potassium hydroxide) used in a saponification process with acetic acid, and adjusting the amount of sodium acetate, potassium acetate or the like as a byproduct, by washing with water. To attain the effects of the present invention more remarkably, preferred are methods (1), (2) and (4), in which an alkali (alkaline earth) metal is highly dispersed.

An alkali metal and/or alkaline earth metal can be added to a resin composition layer (B2), for example, as described above for adding these to EVOH.

(Adhesive Resin Layer (C))

It is preferable that a multilayer structure of the present invention further comprises an adhesive resin layer (C) between a hard layer (A) and either a resin composition layer (B1) or a resin composition layer (B2). An adhesive resin used for the adhesive resin layer (C) is, for example, a modified olefinic polymer having a carboxyl group obtained by chemically bonding an unsaturated carboxylic acid or anhydride thereof to an olefinic polymer by an addition reaction, a graft reaction or the like. Examples of an unsaturated carboxylic acid or anhydrides thereof which can be suitably used include maleic acid, maleic anhydride, fumaric acid, acrylic acid, methacrylic acid, crotonic acid, itaconic acid, citraconic acid and hexahydrophthalic anhydride, particularly maleic anhydride. Specifically, preferable examples include one or two or more in combination selected from the group consisting of maleic anhydride-grafted modified polyethylene, maleic anhydride-grafted modified polypropylene, maleic anhydride-grafted modified ethylene-propylene copolymer, maleic anhydride-grafted modified ethylene-ethyl acrylate copolymer, and maleic anhydride-grafted modified ethylene-vinyl acetate copolymer.

Adhesiveness can be sometimes improved by adding to the adhesive resin a rubber/elastomer component such as polyisobutyrene and ethylene-propylene rubber or a polyolefin resin different from a polyolefin resin as a base of the adhesive resin.

(Multilayer Structure)

It is also preferable that in a multilayer structure of the present invention, a resin composition layer (B1) or a resin composition layer (B2) is disposed between two hard layers (A). Here, an arbitrary other layer can be formed between a hard layer (A) and either a resin composition layer (B1) or (B2).

It is preferable that as the above arbitrary other layer, an adhesive resin layer (C) is disposed between a hard layer (A) and either a resin composition layer (B1) or a resin composition layer (B2). For producing such a multilayer structure, it is enough to finally form a multilayer structure having a layer structure of (A)/(C)/(B1) or (B2)/(C)/(A). Examples of a lamination method for producing the structure include a method comprising co-extruding these resins; a method comprising preliminarily producing a monolayer film or the like used as a resin composition layer (B1) or (B2), or a multilayer film or the like of a resin composition layer (B1) or (B2) and an adhesive resin layer (C) [(C)/(B1) or (B2)/(C)] or the like, and then melt-extruding another resin to these, and a method comprising dry laminating a monolayer film or a multilayer film made of another resin to the above monolayer or multilayer film using a known adhesive. Furthermore, when co-extrusion is conducted by an inflation method, the multilayer structure can be also formed by forming a multilayer film having a layer structure of [outer] (A)/(C)/(B1) or (B2)/(C)[inner], and fusing inner layers in the cylindrical film together by heating or the like followed by winding. A molding temperature during melt molding is often selected from the range of 150 to 300° C. Here, it is also preferable that a resin composition layer (B1) or (B2) is an intermediate layer and adhesive resin layers (C) are formed such that these are directly in contact with both sides of the intermediate layer, to form a layer structure of an adhesive resin layer (C)/(B1) or (B2)/(C). In this case, there are no other resin layers between the resin composition layer (B1) or (B2) and the adhesive resin layer (C).

A thickness of each layer in a multilayer structure having a layer structure of (A)/(C)/(B1) or (B2)/(C)/(A) can vary depending on the type and the application of a thermoplastic resin as a surface layer, the shape of a packaging material and physical properties required, and each of (A)/(C)/(B1) or (B2)/(C)/(A) is generally 5 to 200 μm/1 to 50 μm/1 to 50 μm/1 to 50 μm/5 to 200 μm, preferably 10 to 100 μm/2 to 20 μm/2 to 30 μm/2 to 20 μm/10 to 100 μm. If the hard layer (A) is less than 5 μm, mechanical strength is so insufficient that it tends to be broken, while if it is more than 200 μm, unfavorably flexibility may be reduced and a mass becomes large more than necessary. If a thickness of a resin composition layer (B1) or (B2) is less than 1 μm, gas barrier properties are insufficient and its thickness control becomes unstable, while if it is more than 50 μm, unfavorably flexibility is reduced and it is economically disadvantageous. If the adhesive resin layer (C) is less than 1 μm, interlayer adhesive strength is insufficient and its thickness control becomes unstable, while if it is more than 50 μm, unfavorably flexibility is reduced and it is economically disadvantageous.

A multilayer structure of the present invention is not limited to that having a layer structure of (A)/(C)/(B1) or (B2)/(C)/(A) described above, and can have a structure that a further other layer (X) is formed inside or outside of the hard layer (A), for example, (A)/(X)/(C)/(B1) or (B2)/(C)/(X)/(A), (X)/(A)/(C)/(B1) or (B2)/(C)/(A)/(X), or (X)/(A)/(X)/(C)/(B1)/(C)/(X)/(A)/(X) having 7 or more layers. A resin or composition used for a layer represented by the same symbol in the layer structure can be the same or different. Here, when a plurality of hard layers (A) and adhesive resin layers (C) are used in a multilayer structure of the present invention, a different type of resin for each layer can be used.

A puncture strength of a multilayer structure of the present invention, which can be adjusted depending on an application, is preferably, but not limited to, 4 to 20 N. A multilayer structure having a puncture strength within the range is suitably used for a packaging material or the like. The puncture strength is preferably 5N or more, further preferably 6N or more, particularly preferably 7.5 N or more. A puncture strength of a multilayer structure in the present specification is determined in accordance with JIS Z 1707, specifically by a method described in Examples later.

An oxygen transmission rate (OTR) of a multilayer structure of the present invention can be adjusted depending on its application, and is preferably, but not limited to, 5 $cc/m^2$·day·atm or less. A multilayer structure having an OTR within the range is suitably used as a packaging material or the like. The OTR is preferably 4 $cc/m^2$·day·atm or less, further preferably 3 $cc/m^2$·day·atm or less, particularly preferably 2 $cc/m^2$·day·atm or less. It is determined in accordance with JIS K 7126-2 (equal pressure method; 2006), specifically by a method described in Examples later.

Each layer of a multilayer structure of the present invention can contain various additives described above, a modifier, a filler, another resin and the like for improving molding processability and various physical properties within a range where the effects of the present invention are not impaired.

It is preferable that a recovered material (scrap), that is, end materials and defective articles generated when a multilayer structure of the present invention is produced, is recycled. Thus, in terms of recovering a multilayer structure, out-of-specification articles generated in production can recovered, but a preferable embodiment is recovering multilayer structures distributed on the market. A recovered composition containing a recovered material of a multilayer structure of the present invention is suitably used as a raw material for a multilayer structure.

A multilayer structure of the present invention can be crushed and remolded for the purpose of recycling. A multilayer structure of the present invention is excellent in mechanical strength and thermal formability. Meanwhile, the multilayer structure does not contain any polyamide resin layer, so that there are formed less hard spots which are believed to be caused by crosslinking due to chemical reaction of the polyamide resin with EVOH during melt molding, and a recovered composition obtained by recycling has a good appearance. In the light of further reducing formation of such hard spots, it is preferable that any layer constituting the multilayer structure does not contain a polyamide resin. It is preferable that a recovered composition containing a recovered material of a multilayer structure of the present invention is produced by melt kneading the recovered material of the multilayer structure. The recovered material can be melt-molded by extrusion molding, inflation extrusion, blow molding, melt spinning, injection molding or the like. A melting temperature varies depending on a melting point of the copolymer or the like, and is preferably about 150 to 270° C. The recovered composition can contain an unused resin, and a content of the recovered material in the recovered composition is preferably 10% by mass or more.

A preferable embodiment of the present invention is a packaging material comprising a multilayer structure of the present invention. The packaging material is processed into a shape such as a tube and a bag, which is useful as a packaging material for various products such as foods, drinks, medicines, cosmetics, industrial chemicals, agricultural chemicals and detergents. However, it can be used for a wide variety of applications, which are not limited to the above applications.

A packaged article in which the packaging material is filled with a content is a preferable embodiment of the packaging material. A packaged article of the present invention is useful because flavor deterioration of a content by oxygen can be prevented. Examples of a content which can be charged include, but not limited to, drinks such as wine and fruit juice; foods such as fruits, nuts, vegetables, meat products, infant foods, coffee, jams, mayonnaise, ketchup, edible oils, dressings, sauces, tsukudanis, and dairy products; and other articles such as medicines, cosmetics and gasoline, which tend to be deteriorated in the presence of oxygen.

EXAMPLES

There will be specifically described the present invention with reference to Examples. Unless otherwise stated, the terms "part(s)" and "%" as used in Examples are by weight.

Example 1

A co-extrusion multilayer cast film forming apparatus was used to provide a multilayer structure (five-layer co-extrusion multilayer cast film having a layer structure and layer thicknesses of (A)/(C)/(B1)/(C)/(A)=41 μm/6 μm/6 μm/6 μm/41 μm), in which a hard layer (A) was made of a linear low-density polyethylene (mLLDPE-1; "EVOLUE SP0510" manufactured by Prime Polymer Co., Ltd.) produced by polymerization using a metallocene catalyst, a resin composition layer (B1) was made of a resin composition containing 80 parts by mass of EVOH(ethylene content: 27 mol %, saponification degree: 99.9 mol %, melting point 190° C.) as EVOH(b1) and 20 parts by mass of EVOH(ethylene content: 44 mol %, saponification degree: 99.9 mol %, melting point 165° C.) as EVOH(b2), and an adhesive resin layer (C) was maleic anhydride-modified polyethylene ("Admer NF518" manufactured by Mitsui Chemicals). The film forming conditions are as follows.

Co-Extrusion Conditions

For a hard layer (A), extrusion temperature: supply section/compression section/metering section/die=170/220/220/220° C.

For a resin composition layer (B1), extrusion temperature: supply section/compression section/metering section/die=170/220/220/220° C.

For an adhesive resin layer (C), extrusion temperature: supply section/compression section/metering section/die=170/220/220/220° C.

Extruder:

For a hard layer (A): 32φ extruder model GT-32-A (manufactured by Research Laboratory of Plastics Technology Co., Ltd.)

For an adhesive resin: 25φ extruder model P25-18-AC (manufactured by Osaka Seiki Kosaku)

For a resin composition: 20φ extruder laboratory equipment model ME CO-EXT (manufactured by Toyo Seiki Seisaku-sho, Ltd.)

T die: for 300 mm-width three-material, five-layer (manufactured by Research Laboratory of Plastics Technology Co., Ltd.)

Cooling roll temperature: 60° C.

Take-off speed: 3 m/min

Properties of a multilayer structure and a packaging material obtained were evaluated as follows.

(Puncture Strength)

Using a 20 mmφ single-screw extruder (extrusion temperature: 200° C.), a monolayer film with a thickness of 100 μm made of a resin used for a hard layer (A) was formed, and the monolayer film was used as a test piece. The test piece was humidity-conditioned under the conditions of 23° C. and 50% RH for 24 hours. Then, under the same conditions, a load when a needle with a tip diameter of 1 mm penetrated the test piece at a speed of 50 mm/min was measured, and an average of the measurements was divided by a thickness of the test piece (mm) to calculate a puncture strength (N/mm).

(Thermal Formability)

The multilayer structure was thermoformed by a thermoforming machine (a vacuum-pressure deep drawing forming machine model "FX-0431-3", manufactured by Asano Laboratories Co. Ltd.) into a round-cup shaped packaging material (die shape: upper part: 75 mmϕ; lower part: 60 mmϕ; depth: 37 mm, drawing ratio S=0.5) at a sheet temperature of 110° C. with compressed air (pressure: 5 $kgf/cm^2$). The packaging material thus obtained was visually observed to evaluate thermal formability. The molding conditions and evaluation criteria are as follows.

Heater temperature: 600° C.

Plug: 45φ×65 mm

Mold temperature: 40° C.

A: no abnormality in appearance

B: partial whitening defect

C: broken part observed (Puncture Strength of a Multilayer Structure)

The multilayer structure obtained was humidity-conditioned under the conditions of 23° C. and 50% RH in accordance with JIS Z 1707, and cut into disks with a diameter of 10 cm, to give test pieces. A test piece was fixed using a fixture, and using AUTOGRAPH ("AGS-H" manufactured by Shimadzu Corporation), a needle with a diameter of 1.0 mm having a tip shape of semi-circle with a radius of 0.5 mm at a speed of 50 mm/min was thrusted into the test piece, to determine a maximum stress (N) until the needle penetrated the test piece, as a puncture strength of the multilayer structure.

(OTR)

Using an oxygen transmission quantity measurement apparatus ("MOCON OX-TRAN model 2/20" manufactured by MOCON Inc.), an oxygen transmission rate (OTR) of a multilayer structure obtained was measured under the conditions of 20° C. and 65% RH in accordance with JIS K 7126-2 (equal pressure method; 2006), and an average was determined.

(Recyclability)

A recovered material obtained by crushing a multilayer structure was formed into a film with a thickness of 20 μm using a 20 mmφ extruder. The number of hard spots observed per a unit area of the film obtained ($number/m^2$) was determined. The less the number of hard spots was, the better recyclability was evaluated to be.

A: less than $500/m^2$

B: $500/m^2$ or more and less than $750/m^2$

C: $750/m^2$ or more and less than $1000/m^2$

D: $1000/m^2$ or more

Examples 2 to 9 and Comparative Examples 1 to 5

A multilayer structure and a packaging material were produced as described in Example 1, except that a hard layer (A), a resin composition layer (B1), and an adhesive resin layer (C) were as shown in Table 1, and were subjected to various evaluations. The results are shown in Table 1. In Example 2, a hard layer (A) was an ethylene-methacrylic acid copolymer ionomer, "Himilan 1706" manufactured by Dupont-Mitsui Chemicals Co., Ltd. Example 3 employed "EVOLUE SP1510" manufactured by Prime Polymer Co., Ltd., a linear low-density polyethylene produced by polymerization using a metallocene catalyst. Example 6 employed "EVOLUE SP4510" manufactured by Prime Polymer Co., Ltd., a linear low-density polyethylene produced by polymerization using a metallocene catalyst. Example 7 employed "SLL318" manufactured by Braskem S.A., a plant-derived polyethylene produced from a plant-derived ethylene (a linear low-density polyethylene produced by polymerization using a metallocene catalyst). In Comparative Examples 2 and 5, a layer made of a polyamide resin in place of an adhesive resin layer (C) was formed using a polyamide resin ("Ultramid C40L" manufactured by BASF) in place of maleic anhydride-modified polyethylene. In Example 8, a resin composition layer (B1) was formed using EVOH (ethylene content: 32 mol %, saponification degree: 99.9 mol %, melting point: 183° C.) as EVOH(b1). In Example 9, instead of a resin composition layer (B1), a resin composition layer (B2) was formed using a modified EVOH (ethylene content: 27 mol %, saponification degree: 99.9 mol %, modification degree: 1.0 mol %) containing a modifying group having a primary hydroxy group as described in Table 2, wherein X represents $CH_2OH$ and $R^1$ is a single bond in formula (I).

TABLE 1

| | | | Example 1 | Example 2 | Example 3 | Example 4 | Example 5 |
|---|---|---|---|---|---|---|---|
| A | | Type | mLLDPE-1 | Ionomer | mLLDPE-2 | mLLDPE-1 | mLLDPE-1 |
| | | Density [$g/cm^3$] | 0.903 | 0.960 | 0.915 | 0.903 | 0.903 |
| | | Melting point [° C.] | 98 | 88 | 118 | 98 | 98 |
| | | MFR [g/10 min] | 1.2 | 0.9 | 1.0 | 1.2 | 1.2 |
| | | Puncture strength [N/mm] | 70 | 80 | 60 | 70 | 70 |
| B1 | EVOH (b1) | Ethylene content [mol %] | 27 | 27 | 27 | 27 | 27 |
| | | Melting point [° C.] | 190 | 190 | 190 | 190 | 190 |
| | | Mass ratio [wt %] | 80 | 80 | 80 | 95 | 60 |
| | EVOH (b2) | Ethylene content [mol %] | 44 | 44 | 44 | 44 | 44 |
| | | Melting point [° C.] | 165 | 165 | 165 | 165 | 165 |
| | | Mass ratio [wt %] | 20 | 20 | 20 | 5 | 40 |
| | B2 | Type | — | — | — | — | — |
| | C | Type | Admer NF518 | Admer NF518 | Admer NF518 | Admer NF518 | Admer NF518 |

TABLE 1-continued

| | | | | | | | |
|---|---|---|---|---|---|---|---|
| Property evaluation | | Thermal formability | A | B | A | B | A |
| | | Puncture strength [N] | 8.8 | 8.3 | 7.1 | 8.1 | 9.2 |
| | | OTR [cc/$m^2$ · day · atm] | 1.0 | 1.0 | 1.0 | 0.7 | 3.5 |
| | | Recyclability | B | B | B | B | A |

| | | | Example 6 | Example 7 | Example 8 | Example 9 |
|---|---|---|---|---|---|---|
| A | | Type | mLLDPE-3 | mLLDPE-4 | mLLDPE-1 | mLLDPE-1 |
| | | Density [g/$cm^3$] | 0.938 | 0.918 | 0.903 | 0.903 |
| | | Melting point [° C.] | 127 | 120 | 98 | 98 |
| | | MFR [g/10 min] | 3.8 | 1.0 | 1.2 | 1.2 |
| | | Puncture strength [N/mm] | 50 | 60 | 70 | 70 |
| B1 | EVOH (b1) | Ethylene content [mol %] | 27 | 27 | 32 | — |
| | | Melting point [° C.] | 190 | 190 | 183 | |
| | | Mass ratio [wt %] | 80 | 80 | 80 | |
| | EVOH (b2) | Ethylene content [mol %] | 44 | 44 | 44 | |
| | | Melting point [° C.] | 165 | 165 | 165 | |
| | | Mass ratio [wt %] | 20 | 20 | 20 | |
| B2 | | Type | — | — | — | Modified EVOH |
| C | | Type | Admer NF518 | Admer NF518 | Admer NF518 | Admer NF518 |
| Property evaluation | | Thermal formability | B | B | A | A |
| | | Puncture strength [N] | 4.5 | 6.2 | 8.5 | 6.3 |
| | | OTR [cc/$m^2$ · day · atm] | 1.0 | 1.0 | 1.7 | 0.2 |
| | | Recyclability | B | B | B | B |

| | | | Comparative Example 1 | Comparative Example 2 | Comparative Example 3 | Comparative Example 4 | Comparative Example 5 |
|---|---|---|---|---|---|---|---|
| A | | Type | mLLDPE-1 | mLLDPE-1 | mLLDPE-1 | LDPE | LDPE |
| | | Density [g/$cm^3$] | 0.903 | 0.903 | 0.903 | 0.918 | 0.918 |
| | | Melting point [° C.] | 98 | 98 | 98 | 106 | 106 |
| | | MFR [g/10 min] | 1.2 | 1.2 | 1.2 | 7 | 7 |
| | | Puncture strength [N/mm] | 70 | 70 | 70 | 20 | 20 |
| B1 | EVOH (b1) | Ethylene content [mol %] | 27 | 27 | — | 27 | 27 |
| | | Melting point [° C.] | 190 | 190 | — | 190 | 190 |
| | | Mass ratio [wt %] | 100 | 100 | — | 80 | 80 |
| | EVOH (b2) | Ethylene content [mol %] | — | — | 44 | 44 | 44 |
| | | Melting point [° C.] | — | — | 165 | 165 | 165 |
| | | Mass ratio [wt %] | — | — | 100 | 20 | 20 |
| B2 | | Type | — | — | — | — | — |
| C | | Type | Admer NF518 | Ultramid C40L | Admer NF518 | Admer NF518 | Ultramid C40L |
| Property evaluation | | Thermal formability | C | B | B | C | B |
| | | Puncture strength [N] | 7.1 | 8.4 | 7.2 | 4.0 | 5.7 |
| | | OTR [cc/$m^2$ · day · atm] | 0.4 | 0.4 | 7.0 | 1.0 | 1.0 |
| | | Recyclability | C | D | B | B | D |

mLLDPE-1: "Evolue-SP0510" from Prime Polymer Co., Ltd., mLLDPE-2: "Evolue-SP1510" from Prime Polymer Co., Ltd.
mLLDPE-3: "Evolue-SP4510" from Prime Polymer Co., Ltd., mLLDPE-4: "SLL318" from Braskem S.A.
Ionomer: "Himilan 1706" from Dupont-Mitsui Chemicals Co., Ltd., LDPE: "Novatec LC600" from Japan Polyehylene Corporation

TABLE 2

| Resin composition layer (B2) | Ethylene unit content (mol %) | Saponification degree (mol %) | Modifying agent | X | $R^1$ | Modifying group content (mol %) |
|---|---|---|---|---|---|---|
| Modified EVOH | 27 | 99.9 | 2-methylene-1,3-propanediol diacetate | —$CH_2$—OH | Single bond | 1 |

The results in Table 1 show that the multilayer structure of each Example is excellent in thermal formability and recyclability. In contrast, the multilayer structure of Comparative Example 1, in which a layer consisting exclusively of EVOH with a melting point of 170° C. or higher was formed in place of a resin composition layer (B1), was inferior in thermal formability and recyclability. The multilayer structure of Comparative Example 3 in which a layer consisting exclusively of EVOH with a melting point of less than 170° C. was formed in place of a resin composition layer (B1) was inferior in gas barrier properties. For the multilayer structures of Comparative Examples 2 and 5 in which a polyamide layer was formed in place of an adhesive resin layer (C), when the recovered materials of the multilayer structures were melt-kneaded for recycling, many hard spots were formed due to crosslinking by reaction of the polyamide layer with EVOH, so that it was inferior in recyclability. The multilayer structure of Comparative Example 4 having a layer consisting of “Novatec LC600” manufactured by Japan Polyethylene Corporation, a low-density polyethylene in place of a hard layer (A) has low puncture strength and insufficient hardness, so that it was inferior in thermal formability.

The invention claimed is:

1. A multilayer structure comprising:

a hard layer (A) comprising an olefinic polymer including a linear low-density polyethylene polymer or copolymer, wherein the linear low-density polyethylene polymer or copolymer is made by polymerization using a metallocene catalyst, either a resin composition layer (B1) or a resin composition layer (B2), and an adhesive resin layer (C) comprising maleic anhydride-modified polyethylene, wherein the hard layer (A) has a puncture strength of 45 N/mm or more and 100 N/mm or less;

the resin composition layer (B1) consists of:

an ethylene-vinyl alcohol copolymer (b1) having a melting point $Tm_1$ of 190° C. or more, an ethylene-vinyl alcohol copolymer (b2) having a melting point $Tm_2$ of less than 170° C., and at least one optional additive selected from the group consisting of a saturated aliphatic amide; an unsaturated aliphatic acid amide; a bis-aliphatic acid amide; an aliphatic acid metal salt; a polyolefin having a molecular weight of about 500 to 10,000; an inorganic filler; an aliphatic polyol; an inorganic oxygen absorber; ascorbic acid; an aliphatic acid ester of ascorbic acid; a metal salt of ascorbic acid; hydroquinone; gallic acid; a polyhydric phenol; bis-salicyl aldehyde-imine cobalt; tetraethylenepentamine cobalt; a cobalt-Schiff base complex; a porphyrin; a macrocyclic polyamine complex; a polyethylene-imine-cobalt complex; a terpene compound; a reaction product of an amino acid with a hydroxyl-containing reducing substance; a triphenylmethyl compound; an alkali metal salt of acetic acid; an alkali metal salt of propionic acid; an alkali metal salt of lauric acid; an alkali metal salt of stearic acid; an alkali metal salt of oleic acid; an alkali metal salt of behenic acid sulfuric acid; an alkali metal salt of sulfurous acid; an alkali metal salt of carbonic acid; an alkali metal salt of boric acid; an alkali metal salt of phosphoric acid; an alkaline earth metal acetate salt; an alkaline earth metal borate salt; an alkaline earth metal phosphate salt; and an alkaline earth metal hydrogen phosphate salt;

an ethylene content of the ethylene-vinyl alcohol copolymer (b1) is 18 to 35 mol %;

an ethylene content of the ethylene-vinyl alcohol copolymer (b2) is 38 to 45 mol %;

a saponification degree of each of the ethylene-vinyl alcohol copolymer (b1) and the ethylene-vinyl alcohol copolymer (b2) are 99 mol % or more; and the resin composition layer (B2) is made of a resin comprising a modified ethylene-vinyl alcohol copolymer containing a modifying group having a primary hydroxy group represented by formula (I),

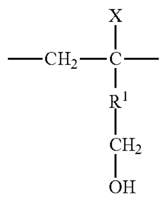

(I)

wherein:

X represents a methyl group or a group represented by $R^2$—OH;

$R^1$ and $R^2$ represent independently of each other a single bond, an alkylene group having 1 to 9 carbon atoms or an alkyleneoxy group having 1 to 9 carbon atoms; and the alkylene group and the alkyleneoxy group optionally contain a hydroxy group, an alkoxy group or a halogen atom.

2. The multilayer structure according to claim 1, wherein a mass ratio (b2/b1) of the ethylene-vinyl alcohol copolymer (b2) to the ethylene-vinyl alcohol copolymer (b1) is 1/99 to 50/50.

3. The multilayer structure according to claim 1, wherein an absolute value |b2−b1| of a difference between an ethylene content (mol %) of the ethylene-vinyl alcohol copolymer (b2) and an ethylene content (mol %) of the ethylene-vinyl alcohol copolymer (b1) is 5 or more.

4. The multilayer structure according to claim 1, wherein the olefinic polymer includes the linear low-density polyethylene polymer.

5. The multilayer structure according to claim 1, wherein the olefinic polymer includes the linear low-density polyethylene copolymer.

6. The multilayer structure according to claim 1, wherein the linear low-density polyethylene polymer or copolymer comprises a plant-derived linear low-density polyethylene.

7. The multilayer structure according to claim 1, wherein the olefinic polymer further comprises an ethylene-unsaturated carboxylic acid copolymer ionomer.

8. The multilayer structure according to claim 1, wherein a density of the olefinic polymer is 0.940 or less.

9. The multilayer structure according to claim 1, wherein a melting point of the olefinic polymer is 130° C. or less.

10. The multilayer structure according to claim 1, wherein a melt flow rate (190° C., 2160 g) of the olefinic polymer is less than 5.0 g/10 min.

11. The multilayer structure according to claim 1, wherein the resin composition layer (B1) or the resin composition layer (B2) is disposed between two hard layers (A).

12. The multilayer structure according to claim 1, comprising the adhesive resin layer (C) between the hard layer (A) and either the resin composition layer (B1) or the resin composition layer (B2).

13. The multilayer structure according to claim 12, having a layer structure of the adhesive resin layer (C)/the resin composition layer (B1) or the resin composition layer (B2)/ the adhesive resin layer (C).

14. The multilayer structure according to claim 12, wherein a mass ratio (b2/b1) of the ethylene-vinyl alcohol copolymer (b2) to the ethylene-vinyl alcohol copolymer (b1) is 5/95 to 40/60.

15. A packaging material comprising the multilayer structure according to claim 1.

16. A recovered composition comprising a recovered material of the multilayer structure according to claim 1.

17. A method for producing a recovered composition, comprising melt kneading a recovered material of the multilayer structure according to claim 1.

18. The multilayer structure according to claim 1, comprising the resin composition layer (B2), wherein X represents a group represented by $R^2$—OH.

* * * * *